(12) United States Patent
Comeau et al.

(10) Patent No.: US 7,519,739 B2
(45) Date of Patent: Apr. 14, 2009

(54) SYNCHRONIZING A CLIENT USER INTERFACE WITH A SERVER BACKEND

(75) Inventors: John W. Comeau, Stouffville (CA); Gin Yee Ng, Richmond Hill (CA); Victor Ka Chun Yu, Hong Kong (CN)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/917,181

(22) Filed: Aug. 11, 2004

(65) Prior Publication Data

US 2005/0050229 A1 Mar. 3, 2005

(30) Foreign Application Priority Data

Aug. 26, 2003 (CA) .................................... 2438362

(51) Int. Cl.
*G06F 15/16* (2006.01)
(52) U.S. Cl. ....................... 709/248; 709/203; 709/246; 715/203; 715/234; 715/238; 715/239; 715/243; 715/700; 715/746
(58) Field of Classification Search ................. 709/203, 709/219, 246, 248; 715/500.1, 203, 234, 715/238, 239, 243, 700, 746
See application file for complete search history.

(56) References Cited

U.S. PATENT DOCUMENTS

| | | | | |
|---|---|---|---|---|
| 5,794,038 A | * | 8/1998 | Stutz et al. | 719/315 |
| 5,802,531 A | | 9/1998 | Lamiraux et al. | 707/514 |
| 6,023,271 A | | 2/2000 | Quaeler-Bock et al. | 345/335 |
| 6,275,226 B1 | | 8/2001 | Uchida et al. | 345/335 |
| 6,992,786 B1 | * | 1/2006 | Breding et al. | 358/1.15 |
| 7,139,975 B2 | * | 11/2006 | Suzuki et al. | 715/513 |
| 2001/0047393 A1 | | 11/2001 | Arner et al. | 709/216 |
| 2003/0093760 A1 | * | 5/2003 | Suzuki et al. | 715/523 |
| 2004/0049742 A1 | * | 3/2004 | Yokoyama et al. | 715/530 |

FOREIGN PATENT DOCUMENTS

| SE | WO02/01403 A1 | 1/2002 |
|---|---|---|
| WO | WO 02/054192 A2 | 7/2002 |

\* cited by examiner

*Primary Examiner*—Michael Won
(74) *Attorney, Agent, or Firm*—Caesar, Rivise, Bernstein, Cohen & Pokotilow, Ltd.

(57) ABSTRACT

In a server system coupled to at least one client system, a method for synchronizing a user interface (UI) presentation to be displayed to a user of the client system to a UI description maintained by the server system, the method comprising the steps of: converting the UI description into one or more UI object definitions; storing each UI object definition in a document; and, transmitting the document to the client system; the client system adapted to convert the UI object definitions to UI objects to generate the UI presentation.

7 Claims, 2 Drawing Sheets

SYNCHRONIZING A CLIENT USER INTERFACE WITH A SERVER BACKEND

CLAIM OF PRIORITY

This application claims the foreign priority benefits under 35 U.S.C. §119 of Canadian Application Patent Serial No. 2,438,362 filed on Aug. 26, 2003, which is incorporated herein by reference.

FIELD OF THE INVENTION

This invention relates generally to client/server systems, and more particularly to the synchronization of client user interfaces with backend servers.

BACKGROUND

In a typical client/server system, client system users access an application or service on a server system through a network. Electronic commerce ("e-commerce") applications are often based on client/server systems and may include server administration tools. For example, an electronic store maintained on the server of an e-commerce system may be accessed via a TCP/IP network by client system users.

Several methods exist enabling users to interact with applications stored on a server system using a client system. One approach is to download the entire application from the server system and then execute it directly on the client system. Unfortunately, there are several shortcomings with this approach. For example, any changes to data shared by multiple client systems would require synchronization.

A variation on this download approach is to provide virtual machine software on the client system. This helps assure that the client system will be able to run the downloaded application, however, a shortcoming exists in that it is difficult to assure that virtual machine software updates are consistent across a large number of client platforms.

Another approach to running applications on a client system allows programs and data to remain on the server system and for programs to execute on the server with control of these programs offered as a service to client systems. This approach has its own shortcomings. For example, the software (i.e. client application) necessary to access a service may not be available on the client system, or that software may be out-of-date.

With respect to the sending of user interface ("UI") or graphical user interface ("GUI") information to the client application from the server application for display to a user, in such a server software based approach, there are several possible schemes. In a simple scheme, the server application would send to the client application the entire graphical image for the UI. Every change to this image made by the server application would require the transmission of an updated image to the client application. This scheme is obviously inefficient and is unsuited for low-bandwidth networks such as cellular telephone networks.

This simple system may be improved by having the server communicate only information pertaining to those portions of the graphical image that have been changed. This improvement is well-known. A more significant improvement is achieved by replicating within the client application the same rendering logic that is used by the server application. However, there are shortcomings with these approaches. For example, the client application is completely dependent on the server application for all updates. This results in increased network usage. Most importantly, this scheme also requires that changes in server application software be synchronized with changes in client application software.

Thus, in a client/server environment, it is often necessary that a client application or UI be synchronized with a server application. For example, when the server application is updated to a new version or service level, the client application or UI will also require updating. The client application or UI may also need to include code to detect a new version or service level of the server application and conditionally display a different UI on the client's display screen.

A need therefore exists for a method of efficiently synchronizing a client application or UI with a backend server application. Accordingly, a solution that addresses, at least in part, the above and other problems is desired.

SUMMARY

According to one aspect of the invention there is provided, in a server system coupled to at least one client system, a method for synchronizing a user interface (UI) presentation to be displayed to a user of the client system to a UI description maintained by the server system, the method comprising the steps of: converting the UI description into one or more UI object definitions; storing each UI object definition in a document; and, transmitting the document to the client system; the client system adapted to convert the UI object definitions to UI objects to generate the UI presentation.

Preferably, the step of transmitting is responsive to a request for the UI presentation by one or more of the client system and the server system.

Preferably, the UI object definitions contain data for the UI presentation.

Preferably, the data contains computer executable code.

Preferably, the data is dynamic data for displaying in the UI presentation.

Preferably, the document is a markup language document such as an Extensible Markup Language (XML) document.

Preferably, the UI presentation is a graphical user interface (GUI) presentation.

In accordance with further aspects of the present invention there is provided an apparatus such as a server system and a client system, a method for adapting these systems, as well as articles of manufacture such as a computer readable medium having program instructions recorded thereon for practising the method of the invention.

Advantageously, the present invention allows for improvements in the efficiency and flexibility of synchronizing the update of UI presentations in client/sever systems. For example, as the maintenance level or version of product code on the server changes, with the present invention it is only necessary to update the server side code that builds a document describing the UI presentation.

BRIEF DESCRIPTION OF THE DRAWINGS

Further features and advantages of the embodiments of the present invention will become apparent from the following detailed description, taken in combination with the appended drawings, in which.

DETAILED DESCRIPTION OF THE PREFERRED EMBODIMENTS

The following detailed description of the embodiments of the present invention does not limit the implementation of the invention to any particular computer programming language. The present invention may be implemented in any computer programming language provided that the operating system ("OS") provides the facilities that may support the requirements of the present invention. A preferred embodiment is implemented in the JAVA™ computer programming language (or other computer programming languages such as the C or C++ computer programming languages in conjunction with JAVA™). (JAVA and all JAVA-based trademarks are the trademarks of Sun Microsystems Corporation.) Any limitations presented would be a result of a particular type of operating system or computer programming language and would not be a limitation of the present invention.

Figure 1:
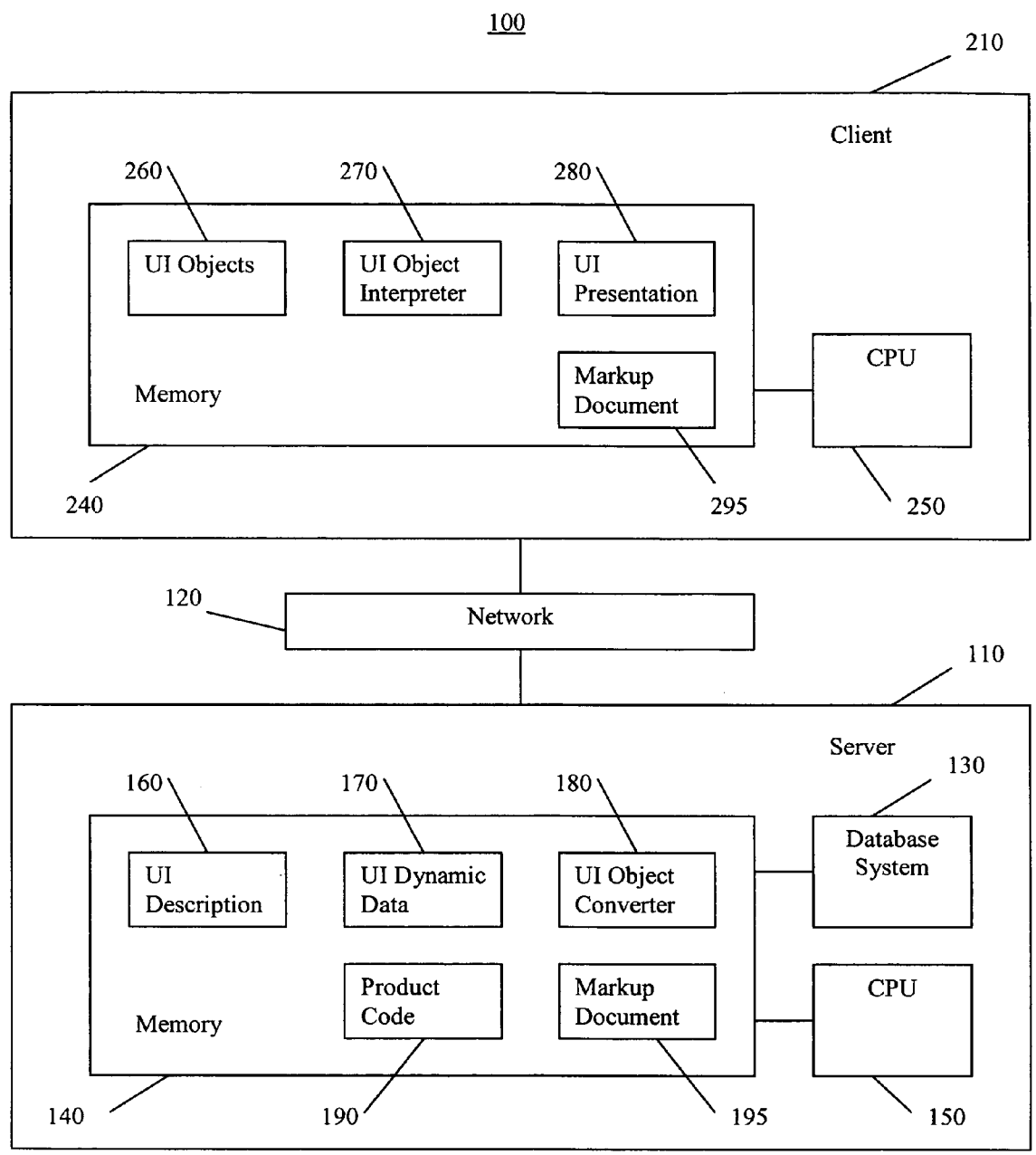
FIG. 1 is a block diagram illustrating an exemplary client/server system in accordance with an embodiment of the invention; and, FIG. 2 is a flow chart illustrating operations of modules within the client/server system for synchronizing a client user interface with a server backend in accordance with an embodiment of the invention.

FIG. 1 is a block diagram illustrating an exemplary client/server system 100 in accordance with an embodiment of the invention. The client/server system 100 includes a server 110 communicating with one or more clients 210 over a network 120, such as the Internet. The server 110 which may be maintained by a software product supplier or other service provider may include a database system 130 for storing and accessing user interface ("UI") information (e.g. UI description 160, UI dynamic data 170, etc.) for one or more clients 210 and provides transaction and content searching functionality. The server 110 and client 210 are adapted to provide UI information 160, 170 in accordance with the present invention. The client 210 may be a personal computer adapted for accessing the user interface information presented by the server 110 over the network 120. The UI interface information includes information pertaining to the format 160 and content 170 of the user interfaces to be presented to client users.

The server's database system 130 may include a database management system ("DBMS") coupled to a database and stored in the memory 140 of the server 110. It will be appreciated that the database system 130 may be shipped or installed without the database to or by end users. In general, the DBMS is adapted to read a query generated by the server 110 in response to a client request for UI information 160, 170 submitted over the network 120. The DBMS then executes the query against the database and provides a query result to the server 110 for presentation to the client user. It will be appreciated that the database system 130 may be stored in the memory 140 of the server 110 or stored in a distributed data processing system (not shown).

An example of a suitable DBMS is the DB2™ Universal Database Management System product sold by IBM™. The DBMS is a software layer interposed between the actual database (i.e. the data as stored for use by the CPU 150 of the server 110) and the users of the system. The DBMS is responsible for handling database transactions thus shielding users from the details of any specific computer hardware or database implementation. Using relational techniques, the DBMS stores, manipulates and retrieves data in the form of table-like relations typically defined by a set of columns or attributes of data types and a set of rows (i.e. records or tuples) of data. The standard database query language for dealing with relational databases implemented by most commercial DBMSs is the Structured Query Language ("SQL").

The server 110 includes a central processing unit ("CPU") 150 operatively coupled to memory 140, which also stores an operating system (not shown) for general management of the server system 110. An example of a suitable server system 110 is an IBM™ iSeries™ computer. The server 110 includes computer executable programmed instructions for directing the server 110 to implement the embodiments of the present invention. The programmed instructions may be embodied in one or more software modules resident on the server 110, for example, the UI object converter module 180 which will be described below. Alternatively, the programmed instructions may be embodied on a computer readable medium (such as a CD disk or floppy disk), which may be used for transporting the programmed instructions to the memory 140 of the server 110. Alternatively, the programmed instructions may be embedded in a computer-readable, signal-bearing medium that is uploaded to a network 120 by a vendor or supplier of the programmed instructions, and this signal-bearing medium may be downloaded to the server 110 from the network 120 by end users or potential buyers.

The CPU 150 of the server 110 is typically coupled to one or more devices (not shown) for receiving user queries or requests and for presenting the results of the queries or requests to users over the network 120. User queries may be transformed into a combination of SQL commands for producing one or more tables of output data, which may be incorporated in one or more UIs or Web pages for presentation to the user. The CPU 150 is coupled to memory 140 for containing programs and data such as base tables or virtual tables such as views or derived tables. The memory 140 may include a variety of storage devices including internal memory and external mass storage typically arranged in a hierarchy of storage as understood to those skilled in the art.

As will also be understood by those skilled in the art, the server 110 may include a number of separate servers depending on system 100 requirements. For example, the server 110 may include separate presentation, application, transaction, data, security, and edge servers.

Each client 210 includes a central processing unit ("CPU") 250 operatively coupled to memory 240 which also stores an operating system (not shown) for general management of the client system 210. An example of a suitable client system 210 is an IBM™ ThinkPad™ computer. The client 210 includes computer executable programmed instructions for directing the client 210 to implement the embodiments of the present invention. The programmed instructions may be embodied in one or more software modules resident on the client 210, for example, the UI object interpreter module 260 which will be described below. Alternatively, the programmed instructions may be embodied on a computer readable medium (such as a CD disk or floppy disk), which may be used for transporting the programmed instructions to the memory 240 of the client 210. Alternatively, the programmed instructions may be embedded in a computer-readable, signal-bearing medium that is uploaded to a network 120 by a vendor or supplier of the programmed instructions, and this signal-bearing medium may be downloaded to the client 210 from the network 120 by end users or potential buyers.

The CPU 250 of the client 210 is typically coupled to one or more devices (not shown) for receiving user queries or requests and for displaying the results of the queries or requests to users on a display screen. Receiving and displaying of user queries and results of queries is performed through a UI typically presented to the user via a computer screen. The CPU 250 is coupled to memory 240 for containing programs and data. The memory 240 may include a variety of storage devices including internal memory and external mass storage typically arranged in a hierarchy of storage as understood to those skilled in the art.

In accordance with the present invention, the UI to be presented to a user via a client 210 is described by server side product code 190 in the server 110 with a UI description 160 and UI dynamic data 170. The product code 190 may be an e-commerce and/or database application, for example. The UI object converter module 180 in the server 110 redefines the UI by breaking the UI into base object components (i.e. UI object definitions). These base object components may be defined in a document such as an Extensible Markup Language ("XML") document 195, for example. This document may be provided to the client 210 as described further below for rendering the UI.

As is known, XML is a flexible way to create common information formats and share both the format and the data on the Web and other networks. XML is a formal recommendation from the World Wide Web Consortium ("W3C") and is similar to the Hypertext Markup Language ("HTML"). An XML document can be processed purely as data by a program, it can be stored, or it can be displayed like an HTML document. Thus, XML is "extensible" because, unlike HTML, the markup symbols are unlimited and self-defining. In addition, XML markup may appear within an HTML page.

Also known, in object-oriented programming (e.g. C++ and Java™), an "object" or "instance of a class" is a unit of computer executable code for implementing a process or task. An object may contain or reference "methods" (also computer executable code) and "data" (e.g. variables) generally shared with other objects in a class of objects.

At the client 210, an object interpreter module 270 converts the UI object definitions in the XML document 295 received from the server 110 over the network 120 into UI objects 260 for use by the client 210 to display the actual UI presentation 280 to a user.

For example, consider product code 190 having a UI requiring that a Java™ window be displayed to a user at the client 210. According to the present invention, the Java™ objects for the window are defined using an XML document 295 or similar markup language document. The client UI object interpreter module 270 reads the XML document 295 transmitted over the network 120 from the server 110, breaks the document 295 down to construct UI objects 260, and generates the Java™ window UI presentation 280 for display to the user.

Advantageously, the use of an XML document 195, 295 allows for improved flexibility. For example, it allows for the creation of instructions (e.g. instantiating an object, invoking a method on an object, etc.), for the creation of operands for these instructions (e.g. object names for method parameters, etc.), and for populating by dynamic data 170.

Another advantage of the present invention is that as the maintenance level or version of the product code on the server 190 changes, possibly causing a change to the UI presentation 280 to be displayed to a user at the client 210, it is only necessary to update the server side code (i.e., the UI object converter 180) that builds the XML document 195 that is sent to the client 210. That is, once the object interpreter module 270 is installed on the client 210, no further client side updates are required to receive the synchronized server function.

Figure 2:
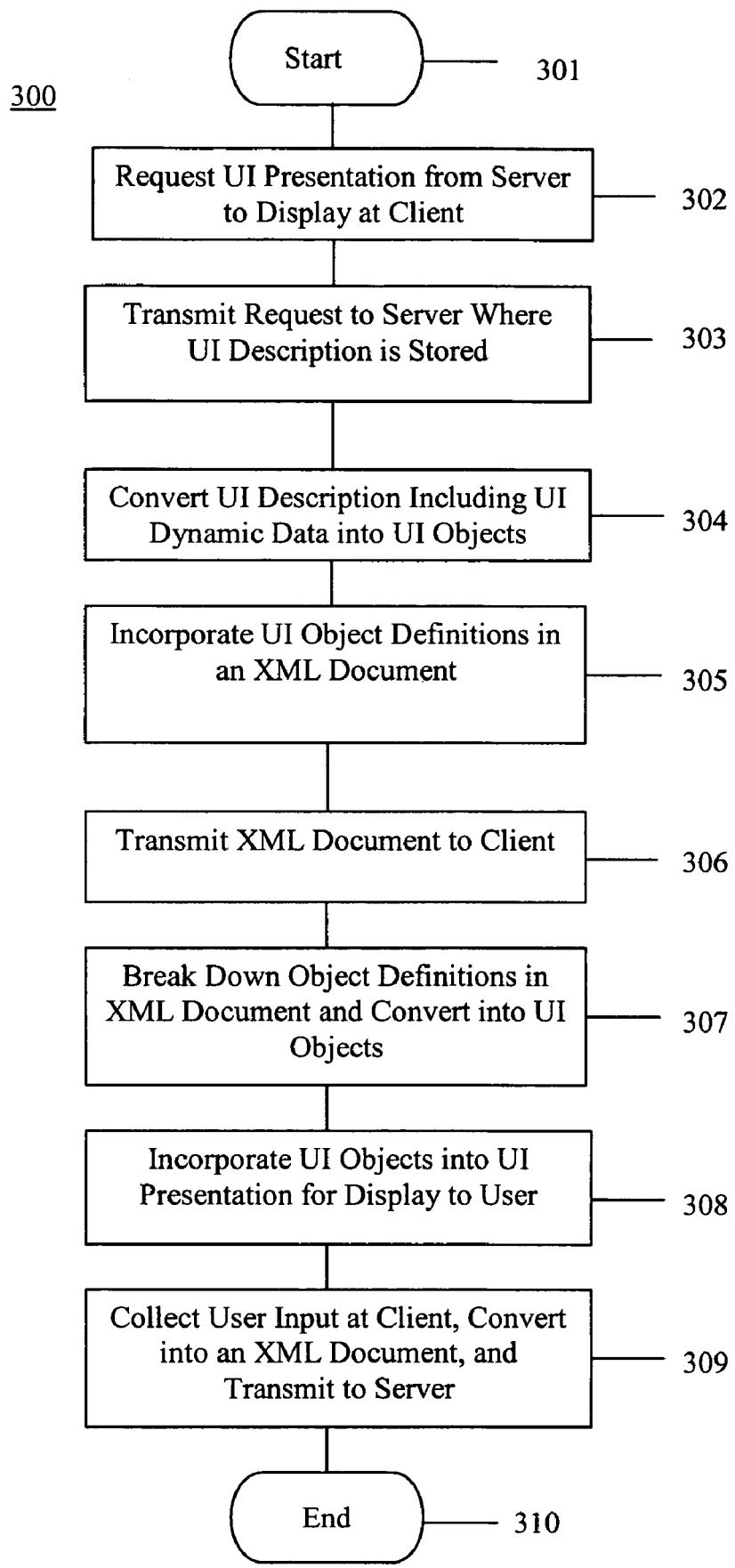

FIG. 2 is a flow chart illustrating operations 300 of modules within a client/server system 100 for synchronizing a client user interface with a backend server in accordance with an embodiment of the invention. At step 301, the operations 300 start.

At step 302, a request for a UI presentation 280 to be displayed on the client 210 is made. This request may be initiated either by the user at the client or by the server.

At step 303, the request is transmitted to the server 110 where the actual UI description 160 is stored.

At step 304, the UI description 160, including any UI dynamic data 170 to be presented in the display to the user, is converted to UI object definitions by the UI object converter module 180.

At step 305, the UI object definitions are incorporated in an XML document 195 by the UI object converter module 180.

At step 306, the XML document 195 is transmitted to the client 210.

At step 307, the UI object interpreter module 270 on the client 210 breaks down the object definitions in the received XML document 295 and converts them into UI objects 260.

At step 308, the UI objects 260 are incorporated into a UI presentation 280 for display to the user.

At step 309, user input is collected at the client 210, converted into an XML document, and is transmitted to the server 110.

At step 310, operations 300 end.

While this invention is primarily discussed as a method, a person of ordinary skill in the art understands that the apparatus discussed above with reference to a computer-implemented client/server system may be programmed or configured to enable the practice of the method of the invention. Moreover, an article of manufacture for use with a data processing system, such as a pre-recorded storage device or other similar computer readable medium including program instructions recorded thereon may direct the data processing system to facilitate the practice of the method of the invention. It is understood that such apparatus and articles of manufacture also come within the scope of the invention.

The embodiment(s) of the invention described above is(are) intended to be exemplary only. The scope of the invention is therefore intended to be limited solely by the scope of the appended claims.

We claim:

1. In a server system coupled to at least one client system, a method for synchronizing a user interface (UI) presentation to be displayed to a user of said at least one client system to a UI description maintained by said server system, said method comprising:

converting said UI description into one or more UI object definitions;

storing each said UI object definition in a document; and transmitting said document to said at least one client system, said at least one client system adapted to convert said UI object definitions to UI objects to generate said UI presentation at said client system in synch with said server system.

2. The method of claim 1 wherein said transmitting is responsive to a request for said UI presentation by one or more systems, wherein said systems comprise said at least one client system and said server system.

3. The method of claim 1 wherein said UI object definitions contain data for said UI presentation.

4. The method of claim 3 wherein said data contains computer executable code.

5. The method of claim 3 wherein said data is dynamic data for displaying in said UI presentation.

6. The method of claim 1 wherein said document is a markup language document.

7. The method of claim 1 wherein said UI presentation is a graphical user interface (GUI) presentation.

* * * * *